United States Patent
Krueger et al.

(10) Patent No.: US 10,415,971 B2
(45) Date of Patent: Sep. 17, 2019

(54) APPARATUS AND METHOD FOR DIMINISHED BIAS ERROR DUE TO POLARIZATION MISMATCH

(71) Applicant: Honeywell International Inc., Morris Plains, NJ (US)

(72) Inventors: Neil Krueger, Saint Paul, MN (US); Mary Salit, Plymouth, MN (US); Barbara Vizenor, Morris Plains, NJ (US); Glen A. Sanders, Scottsdale, AZ (US); Lee K. Strandjord, Tonka Bay, MN (US); Tiequn Qiu, Glendale, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/871,709

(22) Filed: Jan. 15, 2018

(65) Prior Publication Data

US 2019/0219396 A1 Jul. 18, 2019

(51) Int. Cl.
  *G01C 19/72* (2006.01)
  *G02B 6/138* (2006.01)
  *G02B 6/293* (2006.01)

(52) U.S. Cl.
  CPC ......... *G01C 19/727* (2013.01); *G01C 19/722* (2013.01); *G02B 6/138* (2013.01); *G02B 6/29352* (2013.01)

(58) Field of Classification Search
  CPC ....... G01C 19/727; G01C 19/72; G01C 19/66
  USPC ......................................................... 356/461
  See application file for complete search history.

(56) References Cited

U.S. PATENT DOCUMENTS

| 7,379,633 | B1 | 5/2008 | Ashley et al. |
| 7,889,350 | B2 | 2/2011 | Qiu et al. |
| 8,908,187 | B2 * | 12/2014 | Strandjord ........... G01C 19/727 |
| | | | 356/459 |
| 8,947,671 | B2 | 2/2015 | Strandjord et al. |
| 9,541,399 | B2 | 1/2017 | Tazartes et al. |
| 9,823,075 | B2 | 11/2017 | Yao |
| 9,945,670 | B2 | 4/2018 | Lefevre et al. |
| 2008/0079947 | A1 | 4/2008 | Sanders et al. |

(Continued)

FOREIGN PATENT DOCUMENTS

| EP | 0393968 A2 | 10/1990 |
| EP | 1884741 A1 | 2/2008 |

(Continued)

OTHER PUBLICATIONS

European Patent Office, "Extended European Search Report from EP Application No. 19151292.0 dated Jun. 25, 2019", from Foreign Counterpart to U.S. Appl. No. 15/871,709, pp. 1-6, Published: EP.

*Primary Examiner* — Ahshik Kim
(74) *Attorney, Agent, or Firm* — Fogg & Powers LLC (57) ABSTRACT

Bias error in a resonant fiber optic gyroscope (RFOG) is diminished by reducing polarization mismatch between a polarization Eigenstate of optical signals propagating inside of a resonator of the RFOG and the polarization of optical signals being injected into the resonator of the RFOG. The polarization mismatch is reduced by filtering the optical signals circulating in the resonator and the optical signals injected into the resonator with common polarizers.

20 Claims, 4 Drawing Sheets

(56) References Cited

U.S. PATENT DOCUMENTS

| | | | | |
|---|---|---|---|---|
| 2010/0073681 A1* | 3/2010 | Qiu | ................. | G01C 19/721 |
| | | | | 356/460 |
| 2012/0307253 A1* | 12/2012 | Sanders | ............. | G01C 19/727 |
| | | | | 356/461 |
| 2016/0047655 A1* | 2/2016 | Qiu | ................. | G01C 19/727 |
| | | | | 356/461 |

FOREIGN PATENT DOCUMENTS

| | | | |
|---|---|---|---|
| EP | 2251642 | A2 | 11/2010 |
| EP | 2940425 | A1 | 11/2015 |
| EP | 2957863 | A1 | 12/2015 |

* cited by examiner

APPARATUS AND METHOD FOR DIMINISHED BIAS ERROR DUE TO POLARIZATION MISMATCH

BACKGROUND

Resonant fiber optic gyroscopes (RFOGs) have better rotation sensitivity for a given diameter than laser ring gyroscopes and interferometer fiber optic gyroscopes. Thus, RFOGs are desirable because a given level of rotation sensitivity can be achieved with smaller RFOGs, reducing the size of inertial navigation systems incorporating RFOGs. RFOGs, however, are susceptible to bias error because of imperfections in RFOG optical components and parameter mismatches between RFOG signals.

One source of bias error is polarization mismatch between the polarization Eigenstate inside a resonator of the RFOG, and the polarization of light being injected into the resonator of the RFOG. A pair of polarizers is used polarize light circulating in the resonator and light injected into the resonator, e.g. in each of the clockwise and counter-clockwise paths. Polarization mismatch arises because of differences of polarization of the polarizers within a pair. The differences may arise due to variations in manufacturing of each of the pair of polarizers, and their installation in the RFOG. Therefore, there is a need to reduce polarization mismatch.

SUMMARY

A method comprising receiving a first optical signal and a second optical signal; filtering the first optical signal with a first common polarizer having a first polarization; filtering the second optical signal with a second common polarizer having a first polarization; injecting the first filtered signal into an optical resonator so that the first filtered optical signal propagates in a first direction through the optical resonator; injecting the second filtered optical signal into the optical resonator so that it propagates in a second direction through the optical resonator, which is opposite to the first direction; filtering an optical signal propagating in the first direction of the optical resonator with the first common polarizer; and filtering an optical signal propagating in the second direction of the optical resonator with the second common polarizer.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
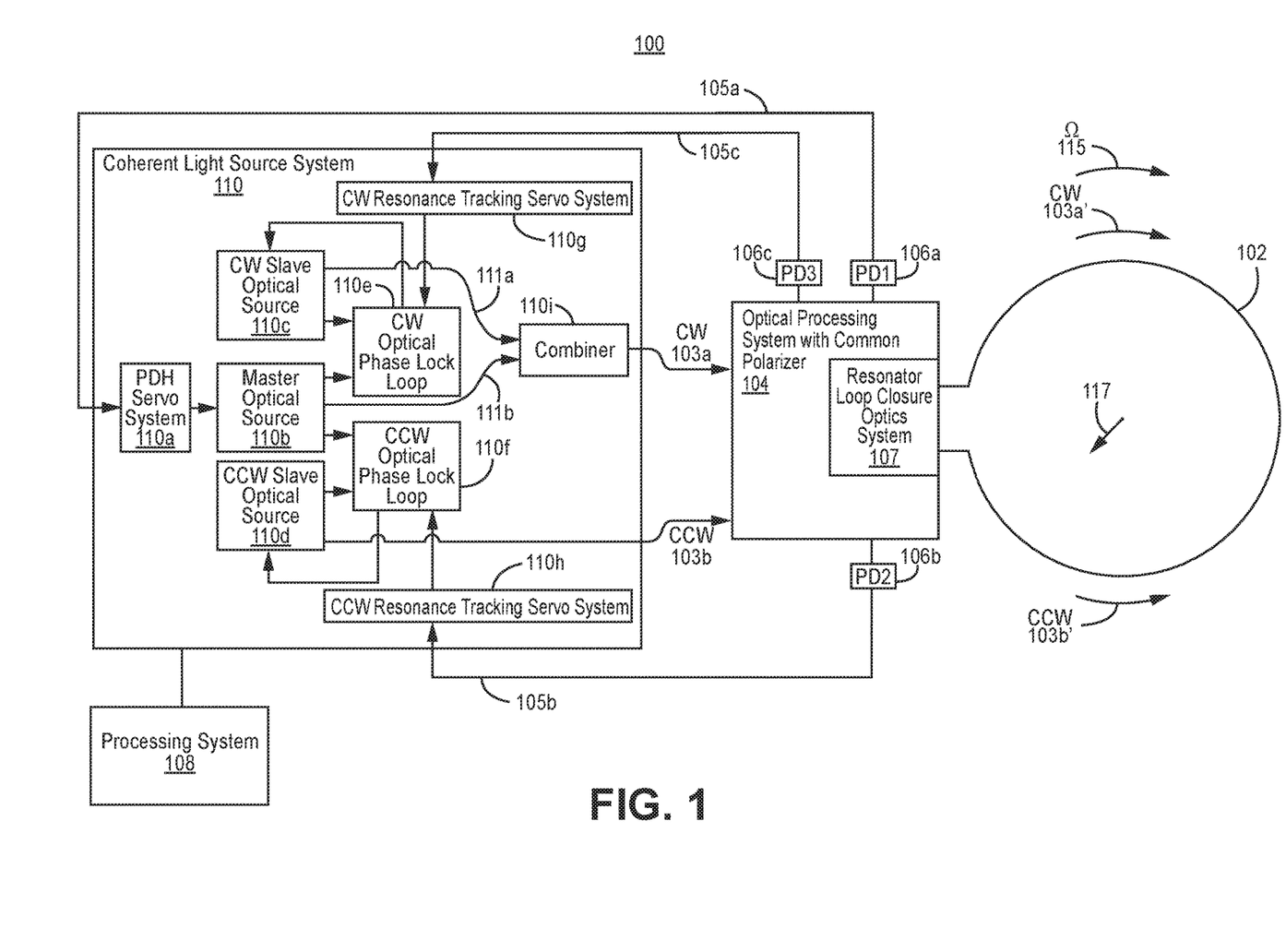
FIG. 1 illustrates a block diagram of one embodiment of a resonant fiber optic gyroscope with an optical processing system with at least one common polarizer.

A resonant fiber optic gyroscope (RFOG) with a single, or common, polarizer per path may be used to overcome the above referenced problem. FIG. 1 illustrates a block diagram of one embodiment of an RFOG with an optical processing system with at least one common polarizer 100. The embodiment of FIG. 1 is but one RFOG architecture in which the present invention can be implemented.

In the illustrated embodiment, the RFOG with an optical processing system with at least one common polarizer 100 includes an optical resonator coil 102, an optical processing system with at least one common polarizer 104, a first photodetector (PD1) 106a, a second photodetector (PD2) 106b, a third photodetector (PD3) 106c, a coherent light source system 110, and a processing system 108. The optical resonator coil 102, usually made of optical fiber, is coupled to the optical processing system with at least one common polarizer 104. The optical processing system with at least one common polarizer 104 includes a resonator loop closure optics system 107. An optical resonator comprises the optical resonator coil 102 and the resonator loop closure optics system 107.

In one embodiment, the optical resonator coil 102 is comprised of turns or windings of optical fiber. The first photodetector 106a, the second photodetector 106b, the third photodetector 106c, and the coherent light source system 110 are coupled to optical processing system with at least one common polarizer 104.

Photodetectors convert incident optical signals into electrical signals. The amplitude of the electrical signal generated by a photodetector is linearly related to the intensity of the incident optical signal. Although three photodetectors are exemplified herein, other embodiments of the RFOG with an optical processing system with at least one common polarizer may have four photodetectors, and the coherent light source system 110 would be alternatively implemented with two Pound-Drever-Hall (PDH) servo systems as illustrated, for example, in U.S. Pat. No. 8,947,671 which is incorporated by reference herein in its entirety. The optional fourth photodetector (PD4) is referenced by way of example elsewhere herein. However, in other embodiments of the RFOG with an optical processing system with at least one common polarizer 100 illustrated in FIG. 1, the optional fourth photodetector can be used for diagnostic purposes.

The processing system 108 is a state machine. In one embodiment, the processing system comprises a processor coupled to a memory. Alternatively, or additionally, the processing system 108 can be implemented by at least one application specific integrated circuit and/or at least one field programmable gate array. The processing system 108 determines the angular rate of rotation of the optical resonator coil 102 by processing signals from the coherent light source system 110. The memory may include program instructions which are executed by the processor to determine the angular rate of rotation 115 of the optical resonator coil 102 about an input axis 117. The angular rate of rotation 115 is determined by the difference between the resonant frequencies of the optical resonator in the clockwise and counter-clockwise directions. This is measured by locking the frequencies, $f_{cw}$ and $f_{ccw}$, of the clockwise (CW) slave optical signal (or first optical signal) 111a and the counter clockwise (CCW) slave optical signals 103b (or second optical signal) to the CW and CCW resonances, respectively, of the optical resonator comprising the optical resonator coil 102 and the resonator loop closure optics system 107. Thus, the processing system 108 uses a frequency difference, $\Delta f$, between the frequency, $f_{cw}$, of the CW slave optical signal and the frequency, $f_{ccw}$, of the CCW slave optical signal to derive the rotation rate output of the optical resonator, e.g. the RFOG with an optical processing system with at least one common polarizer 100. The first optical signal 111a is combined with a master optical signal (or second optical signal) 111b in an optical combiner (combiner) 110i prior to being coupled to the optical processing system with at least one common polarizer 104, and then to the optical resonator. The CCW slave optical signal 103b is also coupled to the optical processing system with at least one common polarizer 104, and then the optical resonator. In another embodiment, signals representative of $f_{ccw}$ and $f_{cw}$ are respectively provided by a CCW resonance tracking servo system 110h and a CW resonance tracking servo system 110g in the coherent light source system 110. In a further embodiment, the angular rate of rotation 115 about the input axis 117 is an angular rate of rotation, $\Omega$, 115 where $\Omega=(\lambda*\Delta f*P)/(4*A)$, $\lambda$ is substantially equal to the average wavelength of the clockwise light signal 103a and the counter-clockwise light signal 103b. A is the area enclosed by the optical resonator coil 102 and P is the perimeter of the optical resonator path of the optical resonator coil 102 and resonator loop closure optics system 107.

The coherent light source system 110, or components therein, may include components not shown in FIG. 1. Such components may be used to amplitude and phase modulate optical signals, and to amplify or split optical signals. In one embodiment, such components include intensity modulator(s), phase modulator(s), optical amplifier(s), optical isolator(s), and optical passive device(s).

The coherent light source system 110 generates a clockwise (CW) optical signal 103a and counter-clockwise (CCW) optical signal 103b which are coupled to the optical resonator coil 102 by the optical processing system with at least one common polarizer 104. In one embodiment, the CW optical signal 103a and the CCW optical signal 103b are linearly polarized. In another embodiment, the linearly polarized CW optical signal 103a and the linearly polarized CCW optical signal 103b are each substantially linearly polarized in one direction, e.g. horizontal or vertical, or P and S polarized. The direction of polarization is ideally the same for the linearly polarized CW optical signal 103a and the linearly polarized CCW optical signal 103b. Polarized CW optical signal 103a' and polarized CCW optical signal 103b' propagate respectively clockwise and counter-clockwise around the optical resonator coil 102.

The optical processing system with at least one common polarizer 104 generates optical feedback signals which are converted to electrical feedback signals by the first photodetector 106a, the second photodetector 106b, and the third photodetector 106c. The first photodetector 106a, the second photodetector 106b, and the third photodetector 106c respectively generate a first feedback signal 105a, a second feedback signal 105b, and a third feedback signal 105c which are coupled to the coherent light source system 110.

In the illustrated embodiment, the coherent light source system 110 comprises a PDH servo system 110a, a CW slave optical source 110c, a master optical source 110b, a CCW slave optical source 110d, a CW resonance tracking servo 110g, a CW optical phase lock loop 110e, a CCW optical phase lock loop 110f, a CCW resonance tracking servo system 110h, and an optical combiner (combiner) 110i. The PDH servo system 110a is configured to receive a first feedback signal 105a, and is coupled to the master optical source 110b and the first photodetector 106a. The CW resonance tracking servo 110g is configured to receive the third feedback signal 105c, and is coupled to the CW optical phase lock loop 110e and the third photodetector 106c. The CW optical phase lock loop 110e is coupled to the CW slave optical source 110c and the master optical source 110b. The CCW resonance tracking servo system 110h is configured to receive the second feedback signal 105b, and is coupled to the CCW optical phase lock loop 110f and the second photodetector 106b. The CCW optical phase lock loop 110f is coupled to the CCW slave optical source 110d and the master optical source 110b.

The optical combiner 110i combines a first optical signal 111a emitted from the CW slave optical source 110c and a second optical signal 111b emitted from the master optical source 110b, and forms the CW optical signal 103a. The CCW slave optical source 110d generates the CCW optical signal 103b.

The first feedback signal 105a and the PDH servo system 110a lock the carrier frequency of the second optical signal 111b emitted by the master optical source 110b to a longitudinal resonant frequency or to a frequency that is offset from a longitudinal resonant frequency of the optical resonator by a fixed frequency (offset frequency). The longitudinal resonant frequency equals q multiplied by a free spectral range (FSR) of the optical resonator, where q is an integer. In some embodiments, the carrier frequency of the second optical signal 111b is locked to q times FSR, or in some embodiments it is locked to $(q+\frac{1}{2})*FSR$. The difference between the longitudinal resonance frequency (or resonance frequency) and the corresponding carrier frequency is the frequency offset.

The third feedback signal 105c and the CW resonance tracking servo system 110g and the CW optical phase lock loop 110e lock the carrier frequency of the first optical signal 111a emitted by the CW slave optical source 110c to a resonant frequency or to a frequency that is offset from a CW resonant frequency of the optical resonator by a fixed offset frequency. The CW resonant frequency equals p multiplied by a free spectral range (FSR) of the optical resonator, where p is an integer. In some embodiments, the carrier frequency of the first optical signal 111a is locked to p times FSR, or in some embodiments it is locked to $(p+\frac{1}{2})*FSR$.

The second feedback signal 105b, the CCW resonance tracking servo system 110h, and CCW phase lock loop 110f lock the carrier frequency of the CCW optical signal 103b emitted by the CCW slave optical source 110d to a resonant frequency or to a frequency that is offset from a CCW resonant frequency of the optical resonator by a fixed offset frequency. The CCW resonant frequency equals m multiplied by a free spectral range (FSR) of the optical resonator, where m is an integer. In some embodiments, the carrier frequency of the CCW optical signal 103b is locked to m times FSR, or in some embodiments it is locked to $(m+\frac{1}{2})*FSR$. In one embodiment, q, p, and m are different integer numbers.

When the CW and CCW carrier frequencies are both locked to offset frequencies, the frequency offsets from optical resonator resonant frequencies are substantially equal; hence, the difference between the carrier frequencies of the first optical signal 111a and the CCW optical signal 103b are equal to Δf as described above, and rotation rate can be derived from Δf as described above.

In one embodiment, the frequency offsets of the first optical signal 111a and the CCW optical signal 103b are substantially zero frequency. In another embodiment, each frequency offset is substantially one half of a free spectral range of the optical resonator. In all embodiments, the first optical signal 111a, the second optical signal 111b, and CCW optical signal 103b are frequency modulated, e.g. by frequency modulating respectively the CW slave optical source 110c, the master optical source 110b, and the CCW slave optical source 110d, to determine optical resonator resonant frequencies. In one embodiment, modulation frequencies for the CW slave optical source 110c, the master optical source 110b, and the CCW slave optical source 110d are all different, so that the CCW resonance tracking servo system 110h, the CW resonance tracking servo system 110g, and the PDH servo system 110a may distinguish detected optical signals from each of the CW slave optical source 110c, the master optical source 110b, and the CCW slave optical source 110d. The frequency modulation causes each of the first optical signal 111a, the second optical signal 111b, and the CCW optical signal 103b to have a spectrum of frequencies centered about a corresponding carrier frequency.

In embodiments where the carrier frequencies of the first optical signal 111a and the CCW optical signal 103b, respectively emitted by the CW slave optical source 110c and the CCW slave optical source 110d, are locked to a frequency offset of substantially one half free spectral range from a resonant frequency of the optical resonator in the CW and CCW directions respectively, the odd sidebands of the CW slave optical source 110c and the CCW slave optical source 110d are locked onto resonant frequencies in the CW and CCW directions respectively. This condition is substantially the same for measuring rotation rate as the case of locking CW and CCW slave optical source carrier frequencies to CW and CCW resonant frequencies of the optical resonator.

In one embodiment, the carrier frequencies of first optical signal 111a, the second optical signal 111b, and the CCW optical signal 103b are controlled as follows. The carrier frequency of the second optical signal 111b is locked to a resonance or an offset frequency corresponding to the CW direction of the optical resonator as shown in FIG. 1. The photodetector PD1 106a detects an incident optical signal, and generates the corresponding first feedback 105a which is provided to the PDH servo system 110a. The PDH servo system 110a is responsive to a frequency component in first feedback signal 105a that is related to the frequency of modulation applied to the carrier frequency of the master optical source 110b. Portions of the second optical signal 111b, emitted by the master optical source 110b, are respectively coupled to the CW optical phase lock loop 110e and the CCW optical phase lock loop 110f. A portion of the first optical signal 111a, emitted by the CW slave optical source 110c, and a portion of the CCW optical signal 103b, emitted by the CCW slave optical source 110d, are respectively coupled to the CW phase lock loop 110e and the CCW phase lock loop 110f. The carrier frequency of the first optical signal 111a is locked to the carrier frequency of the second optical signal 111b within a tunable difference frequency of $f_1$ by the CW optical phase lock loop 110e. The carrier frequency of the CCW optical signal is locked to the master carrier frequency within a tunable difference frequency of $f_2$ by the CCW optical phase lock loop 110f. A tunable difference frequency is a frequency within the tuning range of the corresponding servo system. The CW resonance tracking servo system 110g and the CCW resonance tracking servo system 110h control tunable difference frequencies $f_1$ and $f_2$ so that the carrier frequency of the first optical signal is locked to the CW resonance of the optical resonator (or at a frequency offset of substantially one half free spectral range from it) and the carrier frequency of the CCW optical signal is locked to the CCW resonance of the resonator (or to a frequency offset of substantially one half free spectral range from it). The tunable difference frequencies $f_1$ and $f_2$ are controlled such that the desirable offset of the CW and CCW carrier frequencies from resonance (e.g., substantially zero or substantially one half free spectral range) are maintained during rotation rate changes, and changing environmental conditions, e.g. temperature and vibrations, that can cause the optical resonator resonances to shift over time.

As shown in FIG. 1, the first optical signal 111a emitted from the CW slave optical source 110c and the second optical signal 111b emitted from the master optical source 110b are combined in optical combiner 110i prior to being coupled to the optical processing system with at least one common polarizer 104. Optical combiner 110i may be a bulk optic beam splitter, or a fiber optical direction coupler, or another waveguide directional optical coupler.

In one embodiment, the master optical source 110b, the CW optical source 110c and the CCW optical source 110d each respectively comprise a LASER. Each optical source may include two or more optical outputs provided, e.g., to the optical resonator and optical phase lock loop(s) and implemented with an optical splitter. One or more optical sources may include a phase modulator to frequency modulate respective LASER(s). One or more optical sources may include intensity (or amplitude) modulators to compensate for phase modulation to amplitude modulation noise in phase modulator(s), to equalize the amplitude levels of the baseband component emitted by the slave optical sources, and to stabilize the second optical signal 111b emitted by the master optical source 110b. Each optical source may include optical isolators to prevent leakage of undesired signal into such sources. In another embodiment, the PDH servo system 110a, the CW resonance tracking servo system 110g, and the CCW resonance tracking servo system 110h are respectively implemented with electronic circuitry.

Figure 2A:
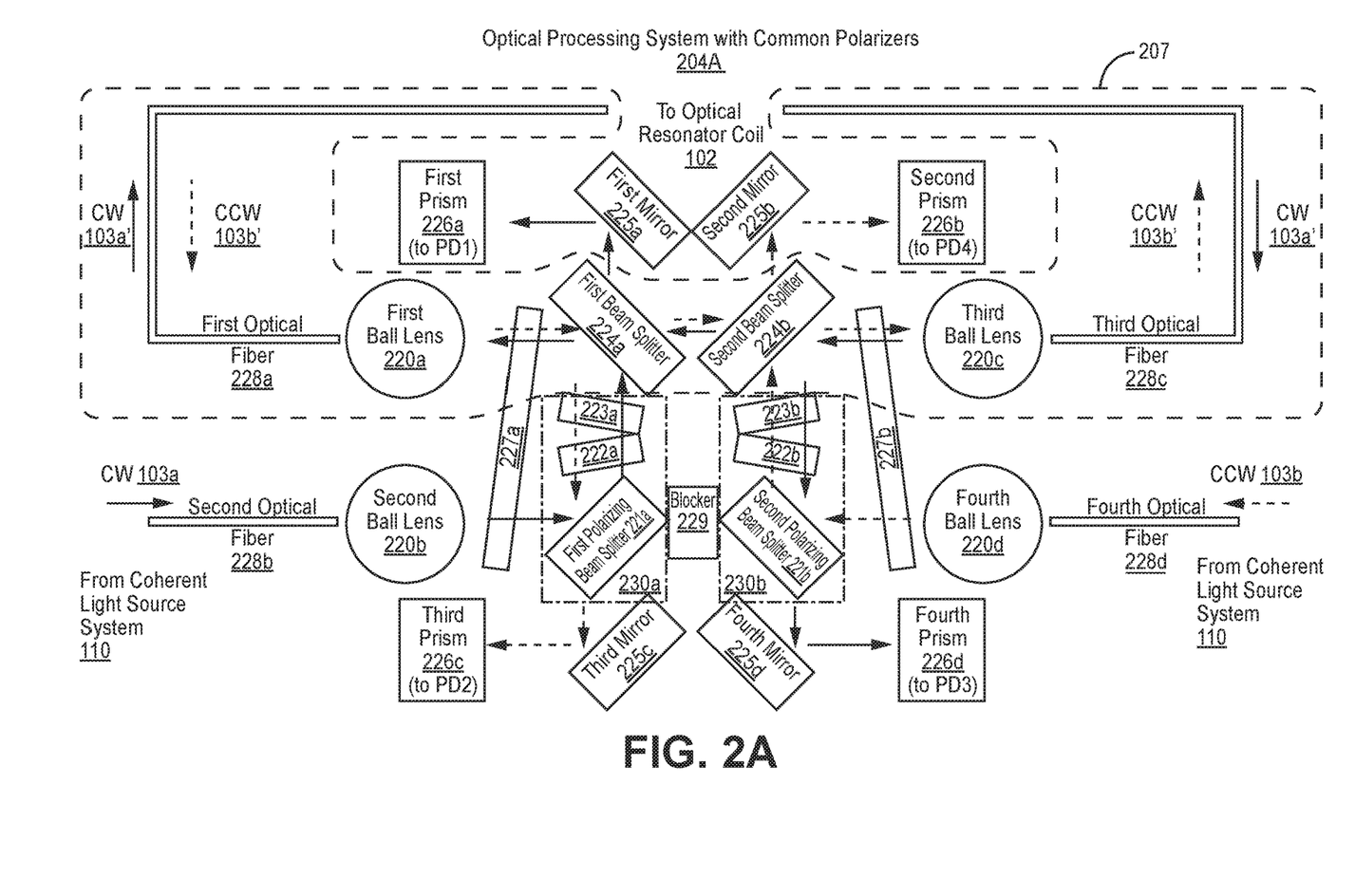
FIG. 2A illustrates one embodiment of the optical processing system with common polarizers.

FIG. 2A illustrates one embodiment of the optical processing system with common polarizers 204A. Embodiments of illustrated optical processing systems with at least one common polarizer illustrated herein may also be referred to as "optical benches".

The illustrated optical processing system with common polarizers 204A comprises a first optical fiber 228a, a second optical fiber 228b, a third optical fiber 228c, a fourth optical fiber 228d, a first ball lens 220a, a second ball lens 220b, a third ball lens 220c, a fourth ball lens 220d, a first common polarizer 227a, a second common polarizer 227b, a first polarizing beam splitter 221a, a second polarizing beam splitter 221b, a first Faraday rotator 222a, a second Faraday rotator 222b, a first half wave plate 223a, a second half wave plate 223b, a first beam splitter 224a, a second beam splitter 224b, a first mirror 225a, a second mirror 225b, a third mirror 225c, a fourth mirror 225d, first detector collection optics (first prism) 226a, second detector collection optics (second prism) 226b, third detector collection optics (third prism) 226c, and fourth detector collection optics (fourth prism) 226d, and a blocker 229. Although labelled prisms in the figures, the collection optics need not be prisms. The collection optics may be implemented with a prism, or a ball lens and an optical fiber. The mirrors referred to above may be fabricated from dielectric(s) and/or metal(s). For pedagogical reasons, the CW optical signal 103a and the CCW optical signal 103b are each substantially linearly polarized being S polarized.

The first Faraday rotator 222a and the first half wave plate 223a are in a first optical path and a second optical path between the first beam splitter 224a and the first polarizing beam splitter 221a. The second Faraday rotator 222b and the second half wave plate 223b are in a third optical path and fourth optical path between the second beam splitter 224a and the second polarizing beam splitter 221a.

In one embodiment, the resonator loop closure optics system 207 comprises the first optical fiber 228a, the third optical fiber 228c, the first ball lens 220a, the third ball lens 220c, the first beam splitter 224a, the second beam splitter 224b, a portion of the first common polarizer 227a, and a portion of the second common polarizer 227b. The portion of the first common polarizer 227a and the portion of the second common polarizer 227b are those portions through which the polarized CW light signal 103a' and the polarized CCW light signal 103b' propagate as those signals propagate around the optical resonator. The optical resonator is comprised of the optical resonator coil 102 and the resonator loop closure optics system 107.

The first polarizing beam splitter 221a and the second polarizing beam splitter 221b highly reflect an optical signal having a first polarization, e.g. S or P polarization, and highly transmit (or pass) an optical signal having a second polarization, respectively P or S polarization. In one embodiment, the reflectance coefficient is greater than ninety nine percent. In another embodiment, the transmittance coefficient is greater than ninety eight percent.

The blocker 229, illustrated in the embodiments is optional, and suppresses any transmitted optical signals having the second polarization from propagating between the first polarizing beam splitter 221a and the second polarizing beam splitter 221b.

The second optical fiber 228b and the fourth optical fiber 228d are configured to be optically coupled to the coherent light source system 110, and respectively receive the CW optical signal 103a and the CCW optical signal 103b. The first optical fiber 228a and the third optical fiber 228c are configured to be coupled to the optical resonator coil 102. The first optical fiber 228a is configured to transmit to and receive from the optical resonator coil 102 respectively a polarized CW optical signal 103a' and a polarized CCW optical signal 103b'. The third optical fiber 228c is configured to respectively transmit and receive from the optical resonator coil 102 a polarized CCW optical signal 103b' and a polarized CW optical signal 103a'. The first detector collection optics 226a, the second detector collection optics 226b, and the third detector collection optics 226c are respectively optically coupled to the first photodetector (PD1) 106a, a fourth (optional) photodetector (PD4) (not shown in FIG. 1), and the second photodetector (PD2) 106b. The fourth detector collection optics 226d is optically coupled to the third photodetector (PD3) 106c. Optical absorbing or deflecting material may be used in lieu of the fourth photodetector (PD4).

The second ball lens 220b and the fourth ball lens 220d respectively receive the CW optical signal 103a and the CCW optical signal 103b from the second optical fiber 228b and the fourth optical fiber 228d, and collimate the CW optical signal 103a and the CCW optical signal 103b respectively on the first common polarizer 227a and the second common polarizer 227b.

Polarizer, as used herein, means an optical filter that transmits substantially only optical signals of a specific polarization, e.g. for linear polarization: vertical or horizontal polarization, or S or P polarization. The term common polarizer, as used herein, means a single polarizer having sufficient spatial dimensions to polarize at least two spatially distinct optical signals.

For linear polarization, the first common polarizer 227a and the second common polarizer 227b transmit substantially only either S or P polarized light, and substantially attenuate respectively P or S polarized light. For pedagogical reasons, the first common polarizer 227a and the second common polarizer 227b will be illustrated as transmitting substantially respectively an S polarized CW optical signal and an S polarized CCW optical signal. Thus, the first common polarizer 227a and the second common polarizer 227b respectively substantially attenuate a P polarized CW optical signal and a P polarized CCW optical signal, e.g. by about forty to sixty decibels with respect to the corresponding S polarized optical signal. The attenuation provided by the first common polarizer 227a and the second common polarizer 227b is desirable because CW optical signal 103a and the CCW optical signal 103b have undesired polarization components, e.g. P polarization components, with power levels which are only twenty to twenty five decibels below the power levels of desired polarization components, e.g. S polarization components.

The S polarized CW optical signal and the S polarized CCW optical signal respectively pass through a first Faraday rotator 222a and a first half wave plate 223a, and a second Faraday rotator 222b and a second half wave plate 223b. Each pair of Faraday rotator and half wave plate respectively rotate the polarization of the S polarized optical signal by forty-five degrees and then negative forty-five degrees. As a result, the polarization of the S polarized optical signal is not changed.

The S polarized CW optical signal and the S polarized CCW optical signal are respectively incident upon the first beam splitter 224a and the second beam splitter 224b. In one embodiment, the first beam splitter 224a and the second beam splitter 224b do not discriminate based upon polarization, i.e. are non-polarizing. The first beam splitter 224a and the second beam splitter 224b transmit first portions of respectively of the S polarized CW optical signal 103a and the S polarized CCW optical signal 103b, incident upon corresponding beam splitters, respectively to the first mirror 225a and the second mirror 225b. The first portions comprise a relatively large percentage, e.g. about ninety-seven percent of the power of the respective optical signals incident upon the beam splitters. The first mirror 225a and the second mirror 225b reflect the first portions respectively to the first detector collection optics 226a and the second detector collection optics 226b.

The first beam splitter 224a and the second beam splitter 224b serve as the input and output couplers for the resonator closure optics 207. The portions of respectively the S polarized CW optical signal and the S polarized CCW optical signal reflected from the first beam splitter 224a and the second beam splitter 224b enter the optical resonator, e.g. the resonator loop closure optics system 207. Specifically, the first beam splitter 224a and the second beam splitter 224b reflect second portions of respectively the S polarized CW optical signal and the S polarized CCW optical signal to respectively the first common polarizer 227a and then the first ball lens 220a, and the second common polarizer 227b and the third ball lens 220c. The second portions comprise a relatively small percentage, e.g. between one and ten percent (such as about three percent), of the power of the respective optical signals incident upon the beam splitters.

As a result of using the first common polarizer 227a, the polarized CW optical signal 103a injected into the optical resonator from the coherent light source system 110 and the polarized CW optical signal 103a' propagating around the optical resonator pass through a single polarizer in route to the resonator coil 102: the first common polarizer 227a. As a result of using the second common polarizer 227b, the polarized CCW optical signal 103b injected into the optical resonator from the coherent light source system 110 and the polarized CCW optical signal 103b' propagating around the optical resonator pass through a single polarizer in route to the resonator coil 102: the second common polarizer 227a. Thus, polarization mismatches between the polarization Eigenstates inside the optical resonator of the RFOG, and the polarizations of respective optical signals being injected into the optical resonator of the RFOG are reduced. As a result, RFOG bias error is reduced.

The S polarized CW optical signal 103a' propagating through the optical resonator coil 102 passes through the third optical fiber 228c and the third ball lens 220c. Upon becoming incident upon the second common polarizer 227b, the second beam splitter 224b reflects a first portion of the S polarized CW optical signal 103a' through the second half wave plate 223b and the second Faraday rotator 222b. The first portion comprises a relatively small percentage, e.g. between one to ten percent (such as about three percent), of the power of the optical signal incident upon the second beam splitter 224b. The second portion of the S polarized CW optical signal 103a' continues to propagate through the first beam splitter 224a, the first common polarizer 227a, the first ball lens 220a, the first optical fiber 228b, and back to the optical resonator coil 102.

When the first portion of the S polarized CW optical 103a' signal passes through the second half wave plate 223b, its polarization is rotated by forty-five degrees. When the first portion of the S polarized rotated CW optical signal passes through the second Faraday rotator 222b, its polarization is rotated by another forty-five degrees. As a result, the first portion of the S polarized CW optical signal is transformed into a P polarized CW optical signal. The P polarized CW optical signal passes through the second polarizing beam splitter 221b and is incident upon the fourth mirror 225d. The fourth mirror reflects the P polarized CW optical signal to the fourth detector collection optics 226d. Note, the use of the second detector collection optics 226b and the fourth photodetector PD4 are optional. The S polarized CCW optical signal 103b' propagating from the optical resonator coil 102 into the optical processing system with common polarizers 204A is analogously processed as described above but by the first optical fiber 228a, the first ball lens 220a, the first common polarizer 227a, the first beam splitter 224a, the second beam splitter 224b, the second common polarizer 227b, the third ball lens 220c, the third optical fiber 228c, the first half wavelength plate 223a, the first Faraday rotator 222a, the first polarizing beam splitter 221a, the third mirror 225c, and the third detector collection optics 226c.

A first circulator 230a comprises the first polarizing beam splitter 221a, the first Faraday rotator 222a, and the first half wave plate 223a. An optical signal injected into a first port of the first circulator 230a (a first port of the first polarizing beam splitter 221a) is ejected from a second port of the first circulator 230a (a port of the first half wave plate 223a). An optical signal injected into the second port of the first circulator 230a (the port of first half wave plate 223a) is ejected from a third port of the first circulator 230a (a second port of the first polarizing beam splitter 221a). A second circulator 230b comprises the second polarizing beam splitter 221b, the second Faraday rotator 222b, and the second half wave plate 223b. The second circulator 230b operates analogously to the first circulator 230a.

Figure 2B:
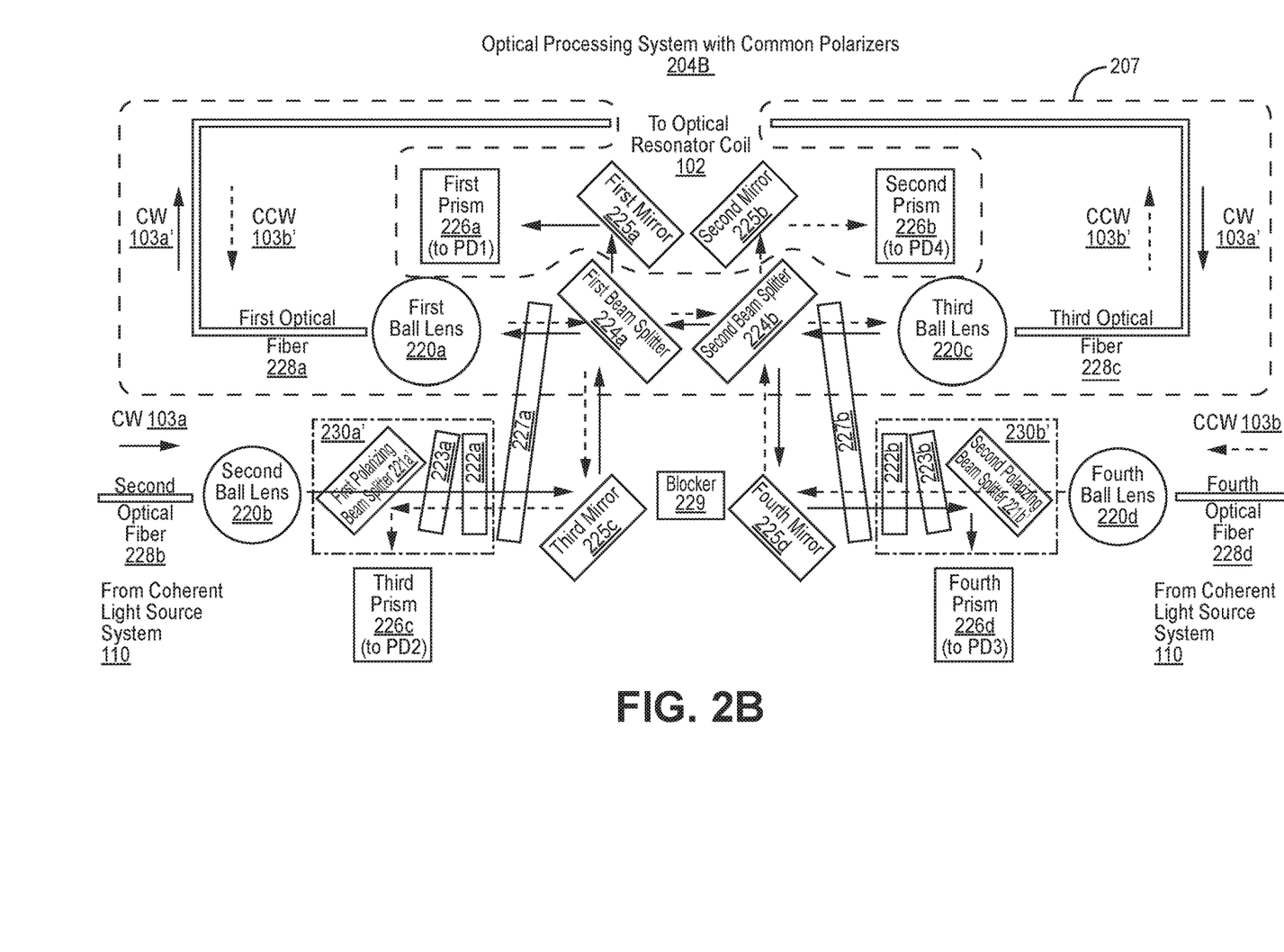
FIG. 2B illustrates another embodiment of an optical processing system with common polarizers.

FIG. 2B illustrates another embodiment of an optical processing system with common polarizers 240B. This other embodiment is similar to the embodiment illustrated in FIG. 2A. However, in this embodiment, the first circulator 230a' and the second circulator 230b' are disposed before respectively the first common polarizer 227a and the second common polarizer 227a; that is optical signals from the coherent light source system 110 propagate though the circulators before propagating through the respective common polarizers. In the optical processing system with common polarizers 204A illustrated in FIG. 2A, the first circulator 230a and the second circulator 230b are disposed after respectively the first common polarizer 227a and the second common polarizer 227b; that is an optical signal from the coherent light source system 110 propagates though the common polarizers before propagating through the respective circulators.

Returning to FIG. 2B, the first Faraday rotator 222a and the first half wave plate 223a which are part of the first circulator 230a' are in a first optical path between the first polarizing beam splitter 221a' and the first common polarizer 227a. The second Faraday rotator 222b and the second half wave plate 222b are in a second optical path between the second polarizing beam splitter 221b' and the second common polarizer 227b.

The embodiment illustrated in FIG. 2B operates similarly to that embodiment illustrated in FIG. 2A with the following exceptions. The CW optical signal 103a and the CCW optical signal 103b are each substantially linearly polarized being P polarized. The first polarizing beam splitter 221a' and the second polarizing beam splitter 221b' of FIG. 2B transmit P polarized optical signals and reflect S polarized optical signals. However, in other embodiments, the above described polarizations in FIGS. 2A and 2B can be reversed.

As a result, the first circulator 230a' and the second circulator 230b' of FIG. 2B are also different than the first circulator 230a and the second circulator 230b of FIG. 2A: the positions of the first Faraday rotator 222a and the second Faraday rotator 222b are respectively reversed with the first half wave plate 223a and the second half wave plate 223b. In the first circulator 230a' and the second circulator 230b', the first Faraday rotator 222a and the second Faraday rotator 222b respectively follow or go after the first half wave plate 223a and the second half wave plate 223b, rather than precede those components. Alternatively, the positions of each pair of Faraday rotator and half wave plate are not reversed, but a face (upon which optical signals are incident) of one of such components is reversed.

As a result, a P polarized CW optical signal 103a is transmitted through the first polarizing beam splitter 221a and transformed into a S polarized CW optical signal by the first half wave plate 223a and the first Faraday rotator 222a. The first half wave plate 223a and the first Faraday rotator 222a each rotate the P polarized CW optical signal 103a by forty-five degrees for a total of ninety degrees. The S polarized CW optical signal propagates through and is filtered by the first common polarizer 227a, and reflected by the third mirror 225c to the first beam splitter 224a. A first portion of the S polarized CW optical signal propagates through and is filtered by the first common polarizer 227a.

The S polarized CCW optical signal 103b', circulating through the optical resonator coil 102 is filtered by the first common polarizer 227a. A portion of the filtered, S polarized CCW optical signal is reflected by the first beam splitter 224a to the third mirror 225c. The third mirror 225c reflects the portion of the filtered, S polarized CCW optical signal is filtered again by the first common polarizer 227a.

The S polarized CW optical signal passes through the first Faraday rotator 222a and the first half wave plate 223a. The first Faraday rotator 222a and the first half wave plate 223a rotate the polarization of the S polarized optical signal by forty-five degrees and then negative forty-five degrees. As a result, the polarization of the S polarized optical signal is unchanged. The other half of the optical processing system with common polarizers 204B, including the second circulator 230b', operates analogously as described above. The term reflector as used herein means a device from which a fraction of incident optical signal is reflected, such as a mirror, a beam splitter, or a polarized beam splitter. Note, the use of the second detector collection optics 226b and the fourth photodetector PD4 are optional.

Optical processing systems with common polarizers may be implemented differently than the embodiments illustrated in FIGS. 2A and 2B. The optical processing system with common polarizers illustrated in FIG. 2B can be implemented with the Faraday rotators and half wave plates in opposite order or with the faces of one of such components reversed. To properly function, the CW optical signal 103a and the CCW optical signal 103b would have to be substantially S polarized, rather than P polarized.

Alternatively, the optical processing system with common polarizers illustrated in FIG. 2A can be implemented without the first mirror 225a, the second mirror 225b, the third mirror 225c, and/or the fourth mirror 225d as long as the respective detector collection optics are optically aligned to receive optical signals from the corresponding beam splitters. Similarly, the optical processing system with common polarizers illustrated in FIG. 2B can be implemented without the first mirror 225a and/or the second mirror 225b as long as the respective detector collection optics are optically aligned to receive optical signals from the corresponding beam splitters. For example, the exemplary system of FIG. 2B can be modified so that the Faraday rotator and the half wave plate have their positions reversed on the right hand side, and that substantially S (rather than P) polarized CCW optical signal is injected, e.g. into the fourth optical fiber 228d, on the right hand side of that optical processing system with common polarizers 204B. Further, alternatively, beam splitters can be used for the third mirror 225c and the fourth mirror 225d illustrated in FIGS. 2A and 2B. Further, device(s), other than optical fibers and ball lens may be used to couple optical signals, e.g. to the common polarizers.

Operation of an exemplary RFOG with an optical processing system with at least one common polarizer will now be further described. Processing to diminish polarization mismatch will be exemplified.

Figure 3:
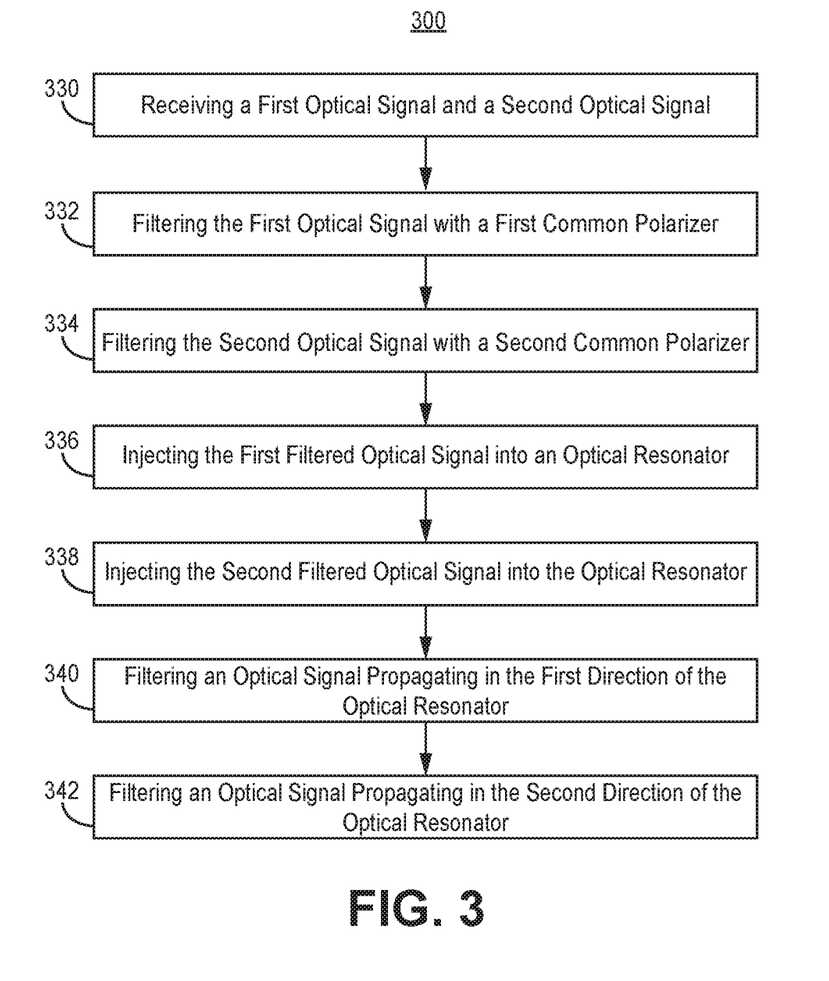
FIG. 3 illustrates an exemplary method of diminishing bias error in a resonant fiber optic gyroscope.

FIG. 3 illustrates an exemplary method 300 of diminishing bias error in an RFOG. To the extent the method 300 shown in FIG. 3 is described herein as being implemented in the system shown in FIGS. 1-2B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 330, receive a first optical signal and a second optical signal, e.g. from the coherent light source system 110. In one embodiment, each of the first optical signal and the second optical signal comprises a first polarization component, e.g. P or S polarization, and a second polarization, e.g. S or P polarization, where the first polarization component has a different polarization and a substantially larger power level than respectively the polarization and the power level of second polarization component. In another embodiment, the power level of the second polarization component is many decibels (e.g. 20-25 dB) less than the power level of the first polarization component.

Alternatively, the first optical signal and the second optical signal have first polarization components having different polarizations and second polarization components having different polarizations. If so, then also transform the first polarization component of the second optical signal so that it has the same polarization as the first optical signal, e.g. before the second optical signal is incident upon a common polarizer.

In block 332, filter the first optical signal with a first common polarizer having a first polarization, i.e. to increase the relative power level of the polarization component having the first polarization with respect to the other polarization component having a different polarization. In block 334, filter the second optical signal with a second common polarizer having a first polarization, i.e. to increase the relative power level of the polarization component having the first polarization with respect to the other polarization component having a different polarization.

In block 336, inject the first filtered optical signal into an optical resonator so that the first filtered optical signal propagates in a first direction through the optical resonator. In block 338, inject the second filtered optical signal into the optical resonator so that it propagates in a second direction through the optical resonator, which is opposite to the first direction.

In block 340, filter an optical signal propagating in the first direction of the optical resonator with the first common polarizer. In block 342, filter an optical signal propagating in the second direction of the optical resonator with the second common polarizer.

EXAMPLE EMBODIMENTS

Example 1 includes a system, comprising: a first common polarizer configured to polarize a first optical signal; a first reflector configured to reflect the polarized first optical signal; a first beam splitter configured to split the reflected, polarized first optical signal into a first portion and a second portion; a second common polarizer configured to polarize a second optical signal; a second reflector configured to reflect the polarized second optical signal; a second beam splitter configured to split the reflected, polarized second optical signal into a first portion and a second portion; wherein the first beam splitter is configured to optically couple the second portion, of the reflected, polarized first optical signal, to a first photodetector; wherein the first beam splitter is further configured to optically couple the first portion, of the reflected polarized first optical signal, to a first port of an optical resonator coil; wherein the second beam splitter is configured to optically couple the first portion, of the reflected, polarized first optical signal to a second port of the optical resonator coil; wherein the first common polarizer is configured to polarize a third optical signal circulating in a first direction in the optical resonator coil; and wherein the second common polarizer is configured to polarize a fourth optical signal circulating in a second direction in the optical resonator coil.

Example 2 includes the system of Example 1, further comprising: a first circulator coupled between the first optical signal and the first common polarizer; wherein the first circulator is configured to be optically coupled to a second photodetector; a second circulator coupled between the second optical signal and the second common polarizer; and wherein the second circulator is configured to be optically coupled to a third photodetector.

Example 3 includes the system of any of Examples 1 and 2, wherein the first reflector comprises a mirror; and wherein the second reflector comprises a mirror.

Example 4 includes the system of any of Examples 1-3, wherein the first circulator comprises: a first polarizing beam splitter; a first Faraday rotator; a first half wave plate; and wherein the first Faraday rotator and the first half wave plate are in at least one optical path between the first polarizing beam splitter and the first common polarizer.

Example 5 includes the system of any of Examples 1-4, wherein the second circulator comprises: a second polarizing beam splitter; a second Faraday rotator; a second half wave plate; and wherein the second Faraday rotator and the second half wave plate are in at least one optical path between the second polarizing beam splitter and the second common polarizer.

Example 6 includes the system of any of Examples 1-5, further comprising a blocker between the first reflector and the second reflector.

Example 7 includes the system of any of Examples 1-6, further comprising: a first Faraday rotator and a first half wave plate; a second Faraday rotator and a second half wave plate; wherein the first reflector is a first polarizing beam splitter, and the first Faraday rotator and the first half wave plate are in at least one optical path between the first beam splitter and the first polarizing beam splitter; wherein the second reflector is a second polarizing beam splitter, and the second Faraday rotator and the second half wave plate are in at least one other optical path between the second beam splitter and the second polarizing beam splitter; wherein the first polarizing beam splitter is configured to optically couple a first polarization component having a first polarization to a second photodetector; and wherein the second polarizing beam splitter is configured to optically couple a second polarization component having a first polarization to a third photodetector.

Example 8 includes the system of any of Examples 1-7, wherein the first photodetector is coupled to the first beam splitter by first collector detection optics.

Example 9 includes the system of any of Examples 1-8, wherein the second beam splitter is configured to optically couple the second portion, of the reflected, polarized second optical signal, to a second photodetector.

Example 10 includes the system of any of Examples 1-9, wherein the second beam splitter is configured to optically couple the second portion, of the reflected, polarized second optical signal, to a second photodetector.

Example 11 includes the system of any of Examples 1-10, wherein the first common polarizer is configured to receive the first optical signal from a first optical fiber through a first ball lens; wherein the second common polarizer is configured to receive the second optical signal from a second optical fiber through a second ball lens; wherein the first common polarizer is configured to receive a third optical signal from a third optical fiber through a third ball lens; and wherein the second common polarizer is configured to receive a fourth optical signal from a fourth optical fiber through a fourth ball lens.

Example 12 includes a method, comprising: receiving a first optical signal and a second optical signal; filtering the first optical signal with a first common polarizer having a first polarization; filtering the second optical signal with a second common polarizer having a first polarization; injecting the first filtered signal into an optical resonator so that the first filtered optical signal propagates in a first direction through the optical resonator; injecting the second filtered optical signal into the optical resonator so that it propagates in a second direction through the optical resonator, which is opposite to the first direction; filtering an optical signal propagating in the first direction of the optical resonator with the first common polarizer; and filtering an optical signal propagating in the second direction of the optical resonator with the second common polarizer.

Example 13 includes the method of Example 12, wherein receiving the first optical signal and the second optical signal comprises receiving the first optical signal and the second optical signal each of which has a first polarization component and a second polarization component, where the first polarization component has a different polarization and a substantially larger power level than respectively the polarization and the power level of second polarization component.

Example 14 includes the method of any of Examples 12 and 13, wherein receiving the first optical signal and the second optical signal each of which has a first polarization component and a second polarization component comprises receiving the first optical signal and the second optical signal, where the first polarization components of each optical signal have different polarizations and the second polarization components of each optical signal have different polarization components.

Example 15 includes a gyroscope, comprising: an optical resonator coil having a first port and a second port; a first photodetector; a second photodetector; a third photodetector; a coherent light source system coupled to the first photodetector, the second photodetector, and the third photodetector, and configured to generate a first optical signal and a second optical signal; a processing system, coupled to the coherent light source system, configured to determine angular rotation of an optical resonator comprising the optical resonator coil; an optical processing system coupled to the first port, the second port, the first photodetector, the second photodetector, the third photodetector, and configured to receive the first optical signal and the second optical signal; and wherein the optical processing system comprises: a first common polarizer configured to polarize a first optical signal; a first reflector configured to reflect the polarized first optical signal; a first beam splitter configured to split the reflected, polarized first optical signal into a first portion and a second portion; a second common polarizer configured to polarize a second optical signal; a second reflector configured to reflect the polarized second optical signal; a second beam splitter configured to split the reflected, polarized second optical signal into a first portion and a second portion; wherein the first beam splitter is configured to optically couple the second portion, of the reflected, polarized first optical signal, to the first photodetector; wherein the first port is configured to receive the first portion of the reflected, polarized first optical signal;

wherein the second port is configured to receive the first portion of the reflected, polarized second optical signal; wherein the first common polarizer is configured to polarize a third optical signal circulating in a first direction in the optical resonator coil; and wherein the second common polarizer is configured to polarize a fourth optical signal circulating in a second direction in the optical resonator coil.

Example 16 includes the system of Example 15, further comprising: a first circulator coupled between the first optical signal and the first common polarizer; wherein the first circulator is configured to be optically coupled to the second photodetector; a second circulator coupled between the second optical signal and the second common polarizer; and wherein the second circulator is configured to be optically coupled to the third photodetector.

Example 17 includes the system of any of Examples 15 and 16, wherein the first circulator comprises: a first polarizing beam splitter; a first Faraday rotator; a first half wave plate; and wherein the first Faraday rotator and the first half wave plate are in at least one optical path between the first polarizing beam splitter and the first common polarizer.

Example 18 includes the system of any of Examples 15-17, wherein the second circulator comprises: a second polarizing beam splitter; a second Faraday rotator; a second half wave plate; and wherein the second Faraday rotator and the second half wave plate are at least in on optical path between the second polarizing beam splitter and the second common polarizer.

Example 19 includes the system of any of the Examples 15-18, further comprising a blocker between the first reflector and the second reflector.

Example 20 includes the system of any of the Examples 15-19, wherein the second beam splitter is configured to optically couple the second portion, of the reflected, polarized second optical signal, to a fourth photodetector.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:
a first common polarizer configured to polarize a first optical signal;
a first reflector configured to reflect the polarized first optical signal;
a first beam splitter configured to split the reflected, polarized first optical signal into a first portion and a second portion;
a second common polarizer configured to polarize a second optical signal;
a second reflector configured to reflect the polarized second optical signal;
a second beam splitter configured to split the reflected, polarized second optical signal into a first portion and a second portion;
wherein the first beam splitter is configured to optically couple the second portion, of the reflected, polarized first optical signal, to a first photodetector;
wherein the first beam splitter is further configured to optically couple the first portion, of the reflected polarized first optical signal, to a first port of an optical resonator coil;
wherein the second beam splitter is configured to optically couple the first portion, of the reflected, polarized first optical signal to a second port of the optical resonator coil;
wherein the first common polarizer is configured to polarize a third optical signal circulating in a first direction in the optical resonator coil; and
wherein the second common polarizer is configured to polarize a fourth optical signal circulating in a second direction in the optical resonator coil.

2. The system of claim 1, further comprising:
a first circulator coupled between the first optical signal and the first common polarizer;
wherein the first circulator is configured to be optically coupled to a second photodetector;
a second circulator coupled between the second optical signal and the second common polarizer; and
wherein the second circulator is configured to be optically coupled to a third photodetector.

3. The system of claim 2, wherein the first reflector comprises a first mirror; and
wherein the second reflector comprises a second mirror.

4. The system of claim 2, wherein the first circulator comprises:
a first polarizing beam splitter;
a first Faraday rotator;
a first half wave plate; and
wherein the first Faraday rotator and the first half wave plate are in at least one optical path between the first polarizing beam splitter and the first common polarizer.

5. The system of claim 2, wherein the second circulator comprises:
a second polarizing beam splitter;
a second Faraday rotator;
a second half wave plate; and wherein the second Faraday rotator and the second half wave plate are in at least one optical path between the second polarizing beam splitter and the second common polarizer.

6. The system of claim 1, further comprising a blocker between the first reflector and the second reflector.

7. The system of claim 1, further comprising:
a first Faraday rotator and a first half wave plate;
a second Faraday rotator and a second half wave plate;
wherein the first reflector is a first polarizing beam splitter, and the first Faraday rotator and the first half wave plate are in at least one optical path between the first beam splitter and the first polarizing beam splitter;
wherein the second reflector is a second polarizing beam splitter, and the second Faraday rotator and the second half wave plate are in at least one other optical path between the second beam splitter and the second polarizing beam splitter;
wherein the first polarizing beam splitter is configured to optically couple a first polarization component having a first polarization to a second photodetector; and
wherein the second polarizing beam splitter is configured to optically couple a second polarization component having a first polarization to a third photodetector.

8. The system of claim 1, wherein the first photodetector is coupled to the first beam splitter by first collector detection optics.

9. The system of claim 7, wherein the second photodetector is coupled to the first polarizing beam splitter by first collector detection optics, and the third photodetector is coupled to the second polarizing beam splitter by second collector detection optics.

10. The system of claim 1, wherein the second beam splitter is configured to optically couple the second portion, of the reflected, polarized second optical signal, to a second photodetector.

11. The system of claim 1, wherein the first common polarizer is configured to receive the first optical signal from a first optical fiber through a first ball lens;
wherein the second common polarizer is configured to receive the second optical signal from a second optical fiber through a second ball lens;
wherein the first common polarizer is configured to receive a third optical signal from a third optical fiber through a third ball lens; and
wherein the second common polarizer is configured to receive a fourth optical signal from a fourth optical fiber through a fourth ball lens.

12. A method, comprising:
receiving a first optical signal and a second optical signal;
filtering the first optical signal with a first common polarizer having a first polarization;
filtering the second optical signal with a second common polarizer having the first polarization;
injecting the first filtered signal into an optical resonator so that the first filtered optical signal propagates in a first direction through the optical resonator;
injecting the second filtered optical signal into the optical resonator so that it propagates in a second direction through the optical resonator, which is opposite to the first direction;
filtering an optical signal propagating in the first direction of the optical resonator with the first common polarizer; and
filtering an optical signal propagating in the second direction of the optical resonator with the second common polarizer.

13. The method of claim 12, wherein receiving the first optical signal and the second optical signal comprises receiving the first optical signal and the second optical signal each of which has a first polarization component and a second polarization component, where the first polarization component has a different polarization and a substantially larger power level than respectively the polarization and the power level of second polarization component.

14. The method of claim 12, wherein receiving the first optical signal and the second optical signal each of which has a first polarization component and a second polarization component comprises receiving the first optical signal and the second optical signal, where the first polarization components of each optical signal have different polarizations and the second polarization components of each optical signal have different polarization components.

15. A gyroscope, comprising:
an optical resonator coil having a first port and a second port;
a first photodetector;
a second photodetector;
a third photodetector;
a coherent light source system coupled to the first photodetector, the second photodetector, and the third photodetector, and configured to generate a first optical signal and a second optical signal;
a processing system, coupled to the coherent light source system, configured to determine angular rotation of an optical resonator comprising the optical resonator coil;
an optical processing system coupled to the first port, the second port, the first photodetector, the second photodetector, the third photodetector, and configured to receive the first optical signal and the second optical signal; and
wherein the optical processing system comprises:
a first common polarizer configured to polarize a first optical signal;
a first reflector configured to reflect the polarized first optical signal;
a first beam splitter configured to split the reflected, polarized first optical signal into a first portion and a second portion;
a second common polarizer configured to polarize a second optical signal;
a second reflector configured to reflect the polarized second optical signal;
a second beam splitter configured to split the reflected, polarized second optical signal into a first portion and a second portion;
wherein the first beam splitter is configured to optically couple the second portion, of the reflected, polarized first optical signal, to the first photodetector;
wherein the first port is configured to receive the first portion of the reflected, polarized first optical signal;
wherein the second port is configured to receive the first portion of the reflected, polarized second optical signal;
wherein the first common polarizer is configured to polarize a third optical signal circulating in a first direction in the optical resonator coil; and
wherein the second common polarizer is configured to polarize a fourth optical signal circulating in a second direction in the optical resonator coil.

16. The gyroscope of claim 15, further comprising:
a first circulator coupled between the first optical signal and the first common polarizer;

wherein the first circulator is configured to be optically coupled to the second photodetector;

a second circulator coupled between the second optical signal and the second common polarizer; and wherein the second circulator is configured to be optically coupled to the third photodetector.

17. The gyroscope of claim 16, wherein the first circulator comprises:

a first polarizing beam splitter;

a first Faraday rotator;

a first half wave plate; and wherein the first Faraday rotator and the first half wave plate are in at least one optical path between the first polarizing beam splitter and the first common polarizer.

18. The gyroscope of claim 16, wherein the second circulator comprises:

a second polarizing beam splitter;

a second Faraday rotator;

a second half wave plate; and wherein the second Faraday rotator and the second half wave plate are at least in on optical path between the second polarizing beam splitter and the second common polarizer.

19. The gyroscope of claim 15, further comprising a blocker between the first reflector and the second reflector.

20. The gyroscope of claim 15, wherein the second beam splitter is configured to optically couple the second portion, of the reflected, polarized second optical signal, to a fourth photodetector.

* * * * *